US 8,495,096 B1

(12) United States Patent
Pereira et al.

(10) Patent No.: US 8,495,096 B1
(45) Date of Patent: *Jul. 23, 2013

(54) DECISION TREE INDUCTION THAT IS SENSITIVE TO ATTRIBUTE COMPUTATIONAL COMPLEXITY

(75) Inventors: Shane Pereira, Los Angeles, CA (US); Zulfikar Ramzan, Cupertino, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,390

(22) Filed: Apr. 18, 2012

Related U.S. Application Data

(63) Continuation of application No. 12/560,298, filed on Sep. 15, 2009, now Pat. No. 8,190,647.

(51) Int. Cl.
*G06F 17/30* (2006.01)
(52) U.S. Cl.
USPC .......... 707/792; 726/23; 726/24; 726/26; 713/188; 713/502; 707/749; 707/780
(58) Field of Classification Search
USPC ............ 707/792, 749, 780; 706/20, 48, 52, 706/12; 726/22, 23, 24, 26; 713/188, 502
See application file for complete search history.

(56) References Cited

U.S. PATENT DOCUMENTS

| | | | |
|---|---|---|---|
| 6,269,353 B1 * | 7/2001 | Sethi et al. | 706/20 |
| 6,301,579 B1 * | 10/2001 | Becker | 1/1 |
| 7,149,698 B2 * | 12/2006 | Guheen et al. | 705/319 |
| 7,787,711 B2 * | 8/2010 | Agam et al. | 382/305 |
| 8,190,647 B1 * | 5/2012 | Pereira et al. | 707/792 |
| 8,397,063 B2 * | 3/2013 | DiCrescenzo | 713/158 |
| 8,401,982 B1 * | 3/2013 | Satish et al. | 706/20 |
| 8,412,656 B1 * | 4/2013 | Baboo et al. | 706/20 |
| 8,413,244 B1 * | 4/2013 | Nachenberg | 726/23 |
| 2004/0019598 A1 * | 1/2004 | Huang et al. | 707/100 |
| 2006/0224579 A1 * | 10/2006 | Zheng | 707/5 |
| 2008/0040362 A1 * | 2/2008 | Aucouturier et al. | 707/100 |
| 2008/0086272 A1 * | 4/2008 | Fillet | 702/19 |
| 2008/0253645 A1 * | 10/2008 | Nauck et al. | 382/159 |
| 2010/0332430 A1 * | 12/2010 | Caraviello et al. | 706/13 |
| 2012/0246727 A1 * | 9/2012 | Elovici et al. | 726/23 |

FOREIGN PATENT DOCUMENTS

EP  2228735 A3 *  5/2011

OTHER PUBLICATIONS

Mal-ID: Automatic Malware Detection Using Common Segment Analysis and Meta-Features, Tahan et al., Aug. 2011.*

* cited by examiner

*Primary Examiner* — Jean M Corrielus
(74) *Attorney, Agent, or Firm* — Fenwick & West LLP

(57) ABSTRACT

A decision tree for classifying computer files is constructed. Computational complexities of a set of candidate attributes are determined. A set of attribute vectors are created for a set of training files with known classification. A node is created to represent the set. A weighted impurity reduction score is calculated for each candidate attribute based on the computational complexity of the attribute. If a stopping criterion is satisfied then the node is set as a leaf node. Otherwise the node is set as a branch node and the attribute with the highest weighted impurity reduction score is selected as the splitting attribute for the branch node. The set of attribute vectors are split into subsets based on their attribute values of the splitting attribute. The above process is repeated for each subset. The tree is then pruned based on the computational complexities of the splitting attributes.

20 Claims, 6 Drawing Sheets

DECISION TREE INDUCTION THAT IS SENSITIVE TO ATTRIBUTE COMPUTATIONAL COMPLEXITY

CROSS-REFERENCE TO RELATED APPLICATIONS

This application is a continuation of prior application Ser. No. 12/560,298, filed Sep. 15, 2009, which is incorporated by reference herein.

BACKGROUND

1. Field of Disclosure

The disclosure generally relates to the field of computer science, in particular to decision tree induction for purposes including identifying rules for detecting malicious software.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware.

Newer techniques for detecting malware apply rules that make an inference about whether a target computer file is malicious by examining attributes of the target file. The rules are typically derived from decision trees that are developed using decision tree induction algorithms, which develop decision trees based on attributes of a training set. The cost associated with determining an attribute value, often referred to as the computational complexity of the attribute, varies among the attributes used in the decision trees. For example, it is less expensive to determine if a file is digitally signed than it is to monitor some aspect of its run-time behavior. Existing decision tree induction algorithms do not take into account such complexity in constructing decision trees and assume that all attributes are equally accessible. Therefore, the decision trees generated by the existing induction algorithms may rely heavily on a few attributes that are effective but very expensive to determine, thereby causing the system performance to suffer. Accordingly, there is a need for techniques that can construct decision trees taking into account computational complexity of attributes used in the decision trees.

SUMMARY

Embodiments of the present disclosure include methods (and corresponding systems and computer program products) for constructing a decision tree that takes into account attribute computational complexity.

One aspect of the present disclosure is a computer-implemented method for constructing a decision tree for classifying computer files that takes into account computational complexities of attributes of the files, comprising: creating a plurality of attribute vectors for a plurality of training files of known classification, each attribute vector comprising values of a predetermined set of attributes for an associated training file; determining a complexity score for each attribute in the predetermined set of attributes, the complexity score measuring a cost associated with determining a value of an associated attribute for a file; and growing a decision tree based on the plurality of attribute vectors, comprising: (1) setting the plurality of attribute vectors as a current set, (2) determining a weighted impurity reduction score for at least one attribute of the predetermined set of attributes based on the complexity score of the attribute, the weighted impurity reduction score quantifying a cost-benefit tradeoff for an associated attribute in classifying the current set, (3) selecting a splitting attribute from the at least one attribute of the predetermined set of attributes, (4) splitting the current set into subsets using the splitting attribute, and (5) repeating steps (2) through (4) for each of the subsets as the current set.

Another aspect of the present disclosure is a computer system for constructing a decision tree for classifying computer files that takes into account computational complexities of attributes of the files, comprising: a computer-readable storage medium comprising executable computer program code for: an attribute complexity determination module for creating a plurality of attribute vectors for a plurality of training files of known classification, each attribute vector comprising values of a predetermined set of attributes for an associated training file, and determining a complexity score for each attribute in the predetermined set of attributes, the complexity score measuring a cost associated with determining a value of an associated attribute for a file; and a decision tree construction module for growing a decision tree based on the plurality of attribute vectors, comprising: (1) setting the plurality of attribute vectors as a current set, (2) determining a weighted impurity reduction score for at least one attribute of the predetermined set of attributes based on the complexity score of the attribute, the weighted impurity reduction score quantifying a cost-benefit tradeoff for an associated attribute in classifying the current set, (3) selecting a splitting attribute from the at least one attribute of the predetermined set of attributes, (4) splitting the current set into subsets using the splitting attribute, and (5) repeating steps (2) through (4) for each of the subsets as the current set.

Still another aspect of the present disclosure is a computer-readable storage medium encoded with executable computer program code for constructing a decision tree for classifying computer files that takes into account computational complexities of attributes of the files, the computer program code comprising program code for: creating a plurality of attribute vectors for a plurality of training files of known classification, each attribute vector comprising values of a predetermined set of attributes for an associated training file; determining a complexity score for each attribute in the predetermined set of attributes, the complexity score measuring a cost associated with determining a value of an associated attribute for a file; and growing a decision tree based on the plurality of attribute vectors, comprising: (1) setting the plurality of attribute vectors as a current set, (2) determining a weighted impurity reduction score for at least one attribute of the predetermined set of attributes based on the complexity score of the attribute, the weighted impurity reduction score quantifying a cost-benefit tradeoff for an associated attribute in classifying the current set, (3) selecting a splitting attribute from the at least one attribute of the predetermined set of attributes, (4) splitting the current set into subsets using the splitting attribute, and (5) repeating steps (2) through (4) for each of the subsets as the current set.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
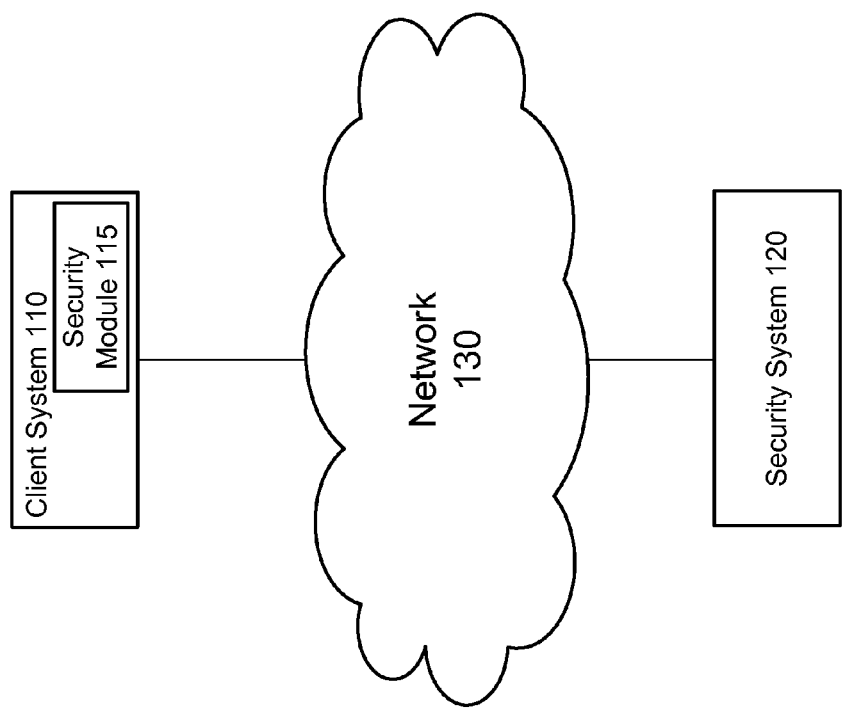
FIG. 1 is a high-level block diagram of a computing environment according to one embodiment of the present disclosure.

FIG. 1 is a high-level block diagram that illustrates a computing environment 100 for constructing a decision tree taking into account attribute computational complexity, and using the decision tree to detect malware, according to one embodiment of the present disclosure. As shown, the computing environment 100 includes a client system 110 and a security system 120 connected through a network 130. Only one of each entity is illustrated in order to simplify and clarify the present description. There can be other entities in the computing environment 100 as well.

The client system 110 is an electronic device that can host malicious software. In one embodiment, the client system 110 is a conventional computer system executing, for example, a Microsoft Windows-compatible operating system (OS), Apple OS X, and/or a Linux distribution. In another embodiment, the client system 110 is another device having computer functionality, such as a personal digital assistant (PDA), mobile telephone, video game system, etc. The client system 110 typically stores numerous computer files that can host malicious software.

Malicious software, sometimes called "malware," is generally defined as software that executes on the client system 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The client system 110 executes a security module 115 for detecting the presence of malware. The security module 115 can be, for example, incorporated into the OS of the computer or part of a separate comprehensive security package. In one embodiment, the security module 115 is provided by the entity that operates the security system 120. The security module 115 can communicate with the security system 120 via the network 130 for classification logic (e.g., a decision tree) for determining whether a file is malware.

The security module 115 determines whether a file is malicious by traversing a decision tree. A decision tree is a classifier in the form of a tree structure that includes branch nodes and leaf nodes. Each branch node specifies an attribute (splitting attribute) and a test (splitting test) to be carried out on the value of the splitting attribute, and branches out to other nodes for all possible outcomes of the splitting test. The branch node that is the root of the decision tree is called the root node. Each leaf node represents a classification (e.g., whether a file is malware or legitimate file). The leaf nodes can also contain additional information about the represented classification such as a confidence score that measures a confidence in the represented classification (i.e., the likelihood of the classification being accurate). For example, the confidence score can be a continuous value ranging from 0 to 1, which a score of 0 indicating a very low confidence (e.g., the indication value of the represented classification is very low) and a score of 1 indicating a very high confidence (e.g., the represented classification is almost certainly accurate). A file can be classified by traversing down the decision tree based on outcomes of the splitting tests of the branch nodes on the path until a leaf node is reached, which provides a classification of the file. The decision tree can be received from the security system 120.

The security system 120 is a hardware device and/or software program configured to construct (or induce) a decision tree for deciding whether a file is malware, and provide the generated decision tree to the client systems 110. An example of the security system 120 is a web-based system providing security software and services allowing the security module 115 to detect and remediate malware on the client systems 110.

The security system 120 constructs the decision tree based on attribute values of a set of training files known to be legitimate or malware. Examples of the attributes include the existence of digital signature, whether the file displays a visible window, whether the file attempts to modify the hosts file, whether the file makes a specific application programming interface (API) call, and whether the file attempts to access the network 130. To simplify the issue, the values of all attributes are assumed to be binary, even though the present disclosure also works with non-binary attributes.

There is a cost associated with determining the value of an attribute (also called attribute value) for a computer file. Such cost (hereinafter called the computational complexity of the underlying attribute) varies among attributes. For example, it is less expensive (e.g., consumes less time) to determine whether an application is digitally signed than it is to monitor some aspect of its run-time behavior such as whether the file attempts to modify the hosts file. This is because the former can be performed without executing the application while the latter involves waiting for the application to do something. The security system 120 takes into account the computational complexity of the attributes in constructing the decision tree by requiring that a more expensive attribute be used as a splitting attribute only if its benefits sufficiently outweigh the benefits of using a less expensive attribute.

The network 130 enables communications between the client system 110 and the security system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
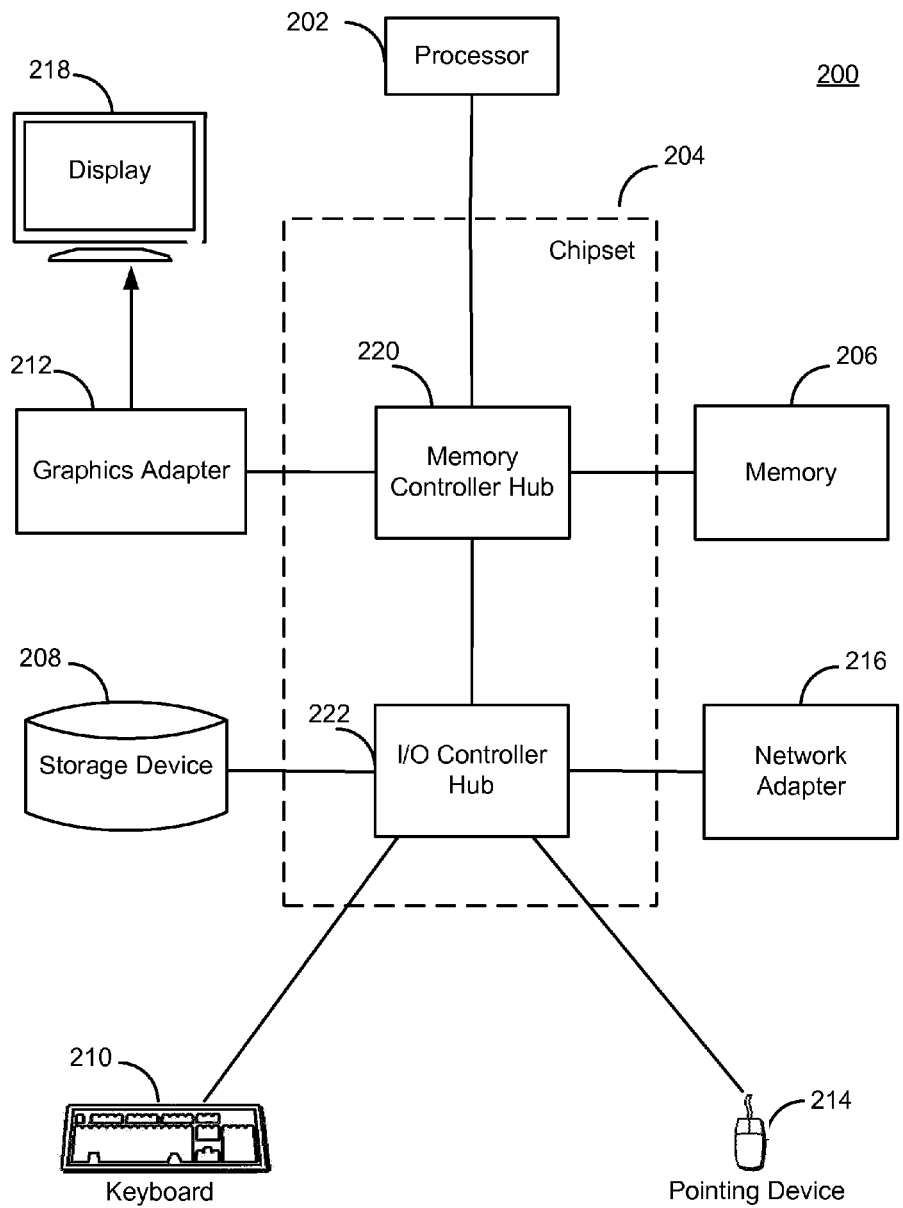
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security system 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.

Example Architectural Overview of the Security Module

Figure 3:
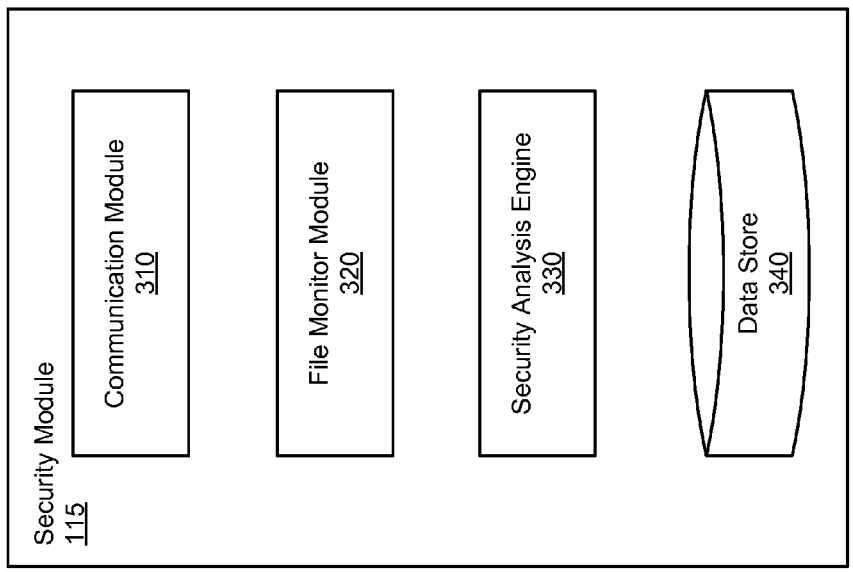
FIG. 3 is a high-level block diagram illustrating modules within a security module according to one embodiment of the present disclosure.

FIG. 3 is a high-level block diagram illustrating a detailed view of modules within the security module 115 according to one embodiment. Some embodiments of the security module 115 have different and/or other modules than the ones described herein. Similarly, the functions can be distributed among the modules in accordance with other embodiments in a different manner than is described here. As illustrated, the security module 115 includes a communication module 310, a file monitor module 320, a security analysis engine 330, and a data store 340.

The communication module 310 communicates with the security system 120 to request and receive a decision tree for detecting malware. The decision tree can be received in a variety of forms, such as a set of rules (e.g., if-then-else statements) derived from the decision tree, a computer program module implementing the decision tree, textual description of the decision tree in an XML file, or any ASCII file format.

The file monitor module 320 monitors computer files within the client system 110 and collects information related to the attributes used in the decision tree (e.g., the splitting attributes of the branch nodes). The file monitor module 320 examines a computer file (e.g., system properties, metadata) to determine values of attributes such as whether the file is digitally signed. The file monitor module 320 also monitors the run-time behaviors of the file to determine values of attributes such as whether the file attempts to modify the hosts file and whether the file attempts to access the network 130. In one embodiment, the file monitor module 320 collects information for a specific attribute of a specific file as requested by the security analysis engine 330. In another embodiment, the file monitor module 320 continuously monitors a predetermined set of attributes for computer files within the client system 110 and stores collected information in the data store 340.

The security analysis engine 330 determines whether a computer file is malicious by traversing down the decision tree according to values of the splitting attributes on the path. In one embodiment, the security analysis engine 330 makes the determination for a file when a suspicious behavior (e.g., an attempt to write to the system registry) is observed for that file. Starting from the root node of the decision tree, the security analysis engine 330 repeatedly determines the value of the splitting attribute for the file by making inquiry to the file monitor module 320, and determines the branch to take for the branch node until a leaf node is reached. The security analysis engine 330 makes the determination based on the classification represented by the leaf node. In one embodiment, the security analysis engine 330 also considers other factors such as the confidence score for the represented classification and the local security policy in making the determination.

The data store 340 stores data used by the client system 110. Examples of such data include information related to the computer files resided on the client system 110 (e.g., attribute values, behavior descriptions, metadata, system properties), the decision tree, and information about the security system 120 (e.g., IP address). The data store 340 may be a relational database or any other type of database.

Example Architectural Overview of the Security System

Figure 4:
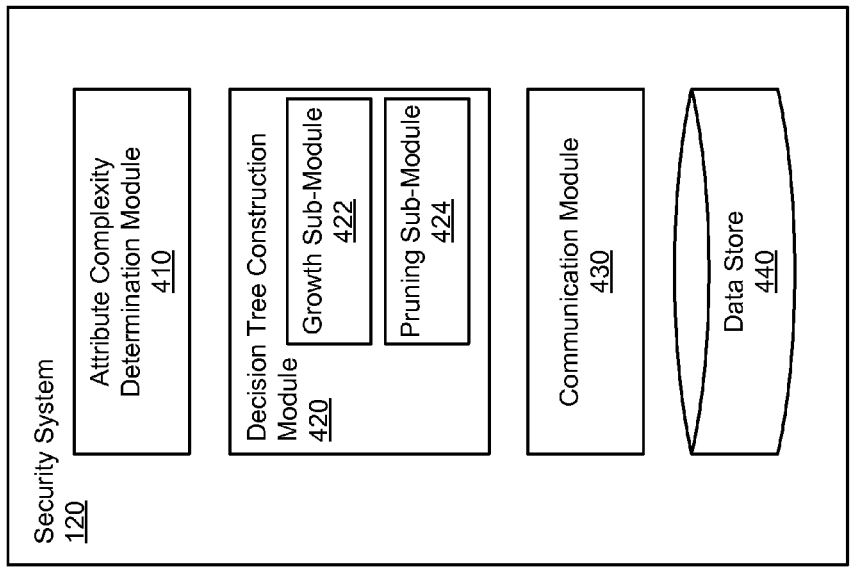
FIG. 4 is a high-level block diagram illustrating modules within a security system according to one embodiment of the present disclosure.

FIG. 4 is a high-level block diagram illustrating a detailed view of modules within the security system 120 according to one embodiment. Some embodiments of the security system 120 have different and/or other modules than the ones described herein. Similarly, the functions can be distributed among the modules in accordance with other embodiments in a different manner than is described here. As illustrated, the security system 120 includes an attribute complexity determination module 410, a decision tree construction module 420, a communication module 430, and a data store 440.

The attribute complexity determination module 410 determines the computational complexities of a predetermined set of attributes (hereinafter called candidate attributes). The attribute complexity determination module 410 creates a set of attribute vectors for a set of training files with known classification (e.g., legitimate or malware) and associates a label with each attribute vector indicating the classification of the corresponding training file. The attribute vector includes values of the candidate attributes for the corresponding training file, such as whether the file is digitally signed and whether the file attempted to modify the hosts file.

The attribute complexity determination module 410 quantifies the computational complexity of each candidate attribute by assigning a complexity score to the attribute. The complexity score of an attribute measures the cost associated with determining the value of the attribute for a computer file. For example, the complexity score can be a continuous value ranging from 0 to 1, which a score of 0 indicating a very high cost (e.g., it takes substantial resources such as time, memory, processing power, and network bandwidth to determine the attribute value) and a score of 1 indicating a very low cost (e.g., the attribute value is readily available). The complexity score can be manually assigned (e.g., based on human knowledge) or automatically generated (e.g., based on statistical data).

The decision tree construction module 420 constructs a decision tree based on the set of attribute vectors created for the training files while taking into account the computational complexities of the attributes in the attribute vectors. As shown, the decision tree construction module 420 includes a growth sub-module 422 and a pruning sub-module 424.

The growth sub-module 422 grows the decision tree by recursively applying a decision tree induction procedure that takes into account the computational complexities of the candidate attributes and the benefits that the attributes provide. The computational complexity of an attribute is measured by its complexity score. The benefits an attribute provides is quantified by an impurity reduction score, which measures how well the attribute separates a set of applicable attribute vectors according to their labels (i.e., legitimate or malware). Entropy is used as a measure of the impurity in the set of applicable attribute vectors. The entropy for a set S is defined as:

$$\text{Entropy}(S) = -p_p \log_2 p_p - p_n \log_2 p_n. \quad (1)$$

In all calculations involving entropy, 0 log 0 is defined to be 0. The impurity reduction score is the expected reduction in entropy caused by splitting the set of attribute vectors based on values of the underlying attribute. The impurity reduction score for an attribute A that splits a set S into two subsets $S_0$ and $S_1$ is defined as:

$$IRScore(A, S) = \text{Entropy}(S) - \frac{|S_0|}{|S|}\text{Entropy}(S_0) - \frac{|S_1|}{|S|}\text{Entropy}(S_1). \quad (2)$$

Thus, the impurity reduction score is the difference between the entropy of the set S and the sum of the entropies of the partitioned subsets $S_0$ and $S_1$ weighted by the fraction of instances that belong to the subsets.

The growth sub-module 422 starts the growing process by establishing a root node and selecting a splitting attribute for the root node from the set of candidate attributes. The goal for the growth sub-module 422 is to select the attribute with the best benefit-cost tradeoff, that is, the attribute that provides substantial benefits in separating the applicable attribute vectors and is relatively inexpensive to determine. According to one embodiment, the growth sub-module 422 calculates a weighted impurity reduction score for each candidate attribute and selects the attribute with the highest weighted impurity reduction score as the splitting attribute for the root node. The splitting attribute splits the set of attribute vectors into two subsets according to their values of the splitting attribute.

A weighted impurity reduction score is a measure that quantifies a cost-benefit tradeoff for an attribute in classifying a set of attribute vectors. In one example, the weighted impurity reduction score for an attribute A to classify a set S is defined as:

$$\text{Weighted IR Score}(A,S) = \text{IR Score}(A,S) \times \text{Complexity Score}(A). \quad (3)$$

Accordingly, the attribute with the highest impurity reduction score is not necessarily the attribute with the highest weighted impurity reduction score. Another attribute which may not reduce impurity as much, but is much cheaper to compute (much higher complexity score) may well have a higher weighted impurity reduction score.

The growth sub-module 422 also determines whether a predetermined stopping criterion is met. Stopping criteria are designed to prevent over-analysis of the training files. Examples of the stopping criteria include (1) if the number of applicable attribute vectors is below a first predefined numeric threshold value then stop, and (2) if the impurity reduction scores for all candidate attributes are below a second predefined numeric threshold then stop. When a stopping criterion is met, the growth sub-module 422 sets the current node as a leaf node. The represented classification of the leaf node is the classification of a majority of the applicable attribute vectors. The confidence score of the represented classification is the fraction of the majority in all applicable attribute vectors. For example, if there are 10 applicable attribute vectors, and 6 of which are malware, then the leaf node would represent a classification of malware and has a confidence score of 0.6.

The growth sub-module 422 recursively applies the decision tree induction procedure at each subset of attribute vectors to create nodes that branch off from the branch node associated with the parent set. For example, if the splitting attribute for the root node is whether the file is digitally signed, then the left branch considers only those attribute vectors with an attribute value NO for this attribute (i.e., training files that are not digitally signed) and the right branch considers the rest (i.e., training files that are digitally signed).

This procedure continues for the remaining subsets until all subsets are represented by a node in the decision tree.

The growth sub-module 422 gives more weight to the impurity reduction scores of those attributes that are relatively inexpensive to determine (low computational complexity, high complexity score). Thus, the growth sub-module 422 selects a less expensive attribute as the splitting attribute, so long as the resulting sacrifice in impurity reduction is not that much worse comparing to using a more expensive attribute. Therefore, nodes associated with less complex attributes are more likely placed higher up in the decision tree. As a result, traversing the decision tree in the field (e.g., by the security module 115) tends to be faster (because the splitting attributes along the way are likely inexpensive to determine).

In one embodiment, rather than using the complexity score as the weight of the associated attribute across the board, the growth sub-module 422 calculates a weight value for the attribute by applying a weight function to the associated complexity score and uses the weight value to determine the weighted impurity reduction score. The weight value measures a significance of the complexity score for an attribute as it applies to the node at issue and the applicable attribute vectors. The weight function takes into account factors such as the depth of the node at issue and the size of the applicable attribute vectors. The weight function assigns low weights to attributes with low complexity scores because their values are expensive to determine (e.g., time consuming). The resulting weight value becomes less sensitive to the complexity score as the depth of the current node grows. The deeper a node is located in the decision tree, the longer it takes to travel to the node from the root node because more time will be spent for determining the values of the splitting attributes for the branch nodes along the way. As a result, the benefit of balancing the cost and benefits of attributes at that node is reduced. The resulting weight also becomes less sensitive to the complexity score as the number of applicable attribute vectors decreases. A small set of applicable attribute vectors suggests that the chance the node is visited to classify a file is low. Thus, utilizing a more expensive attribute in such a node would not have much impact on the overall efficiency of the decision tree. By using the weight function, the growth sub-module 422 beneficially modifies the weight values for candidate attributes as the procedure proceeds, and thereby growing a better decision tree.

The pruning sub-module 424 prunes the decision tree grown by the growth sub-module 422 to prevent over-fitting on the training files. The pruning sub-module 424 prunes a branch node (i.e., replacing it with a leaf node) if the error associated with the pruned tree is no greater than the error associated with the unpruned tree, where the error is measured with respect to a set of examining files independent from the training files. The examining files are selected to represent real-world files that the decision tree will be used to examine in field (e.g., in the client system 110). The pruning sub-module 424 also helps to make the decision tree more compact.

In one embodiment, the pruning sub-module 424 considers the computational complexity of the splitting attributes when determining whether to prune sub-trees rooted at the corresponding branch nodes such that branch nodes of expensive attributes are more likely pruned. For example, if the weighted impurity reduction score of a splitting attribute is below a predetermined numeric threshold value, the pruning sub-module 424 prunes the corresponding branch node (i.e., replacing the branch node with a leaf node).

The communication module 430 receives requests from the security modules 115 running on the client systems 110 and provides the constructed decision tree to the security modules 115. The decision tree can be used in the security module 115 for general purpose malware detection.

The data store 440 stores data used by the security system 120. Examples of such data include the set of training files and associated attribute vectors, the set of examining files and associated attribute vectors, the constructed decision tree and associated information (e.g., splitting attributes, splitting tests, weighted impurity reduction scores), and client systems 110, to name a few. Similar to the data store 340, the data store 440 may be a relational database or any other type of database.

Overview of Methodology for the Security Module

Figure 5:
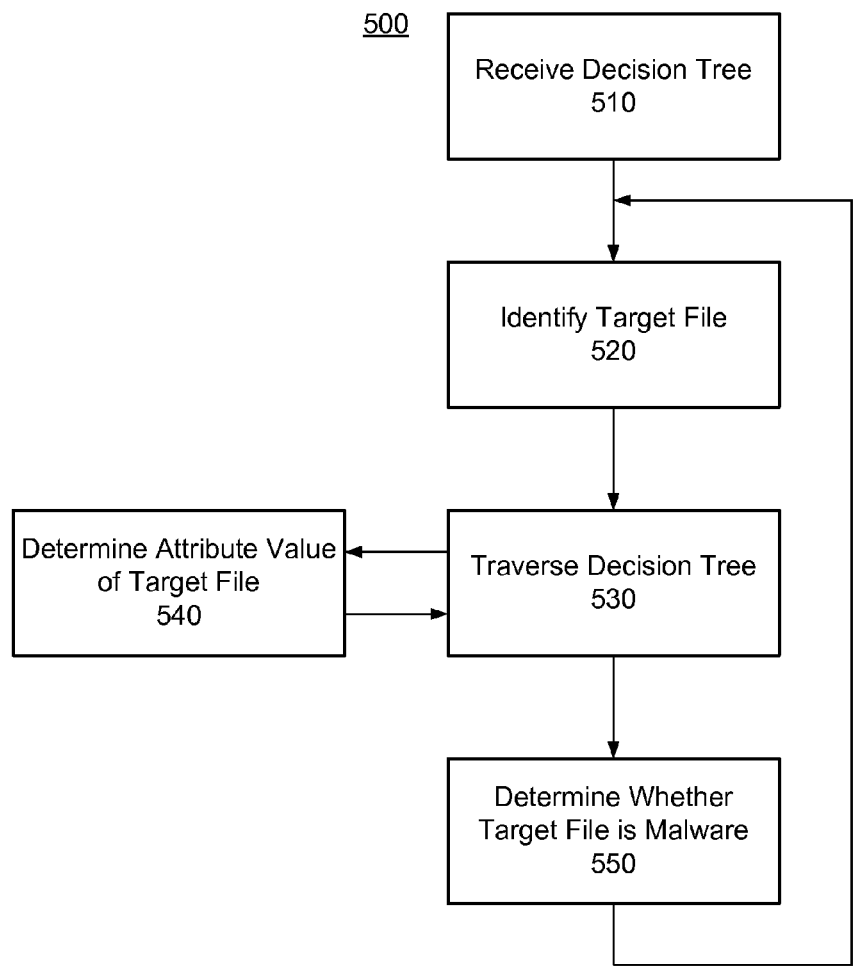
FIG. 5 is a flow diagram illustrating a process for using a decision tree to detect malware according to one embodiment of the present disclosure.

FIG. 5 is a flow diagram illustrating a process 500 for the security module 115 to determine whether a computer file is malware by traversing a decision tree, according to one embodiment. Other embodiments can perform the steps of the process 500 in different orders. Moreover, other embodiments can include different and/or additional steps than the ones described herein.

Initially, the security module 115 running on the client system 110 receives a decision tree from the security system 120 via the network 130. The security module 115 identifies 520 a target computer file for security scrutiny. For example, the security module 115 monitors files residing on the client system 110, observes an attempt to perform a suspicious activity by one of the monitored files, and identifies 520 that file as the target file for security scrutiny.

The security module 115 traverses 530 down the received decision tree based on attribute values of the target file. Starting at the root node of the decision tree, the security module 115 determines 540 the attribute value of the splitting attribute of the branch node and traversing 530 down the decision tree based on the attribute value until a leaf node is reached. The values of some of the attributes can be determined 540 without executing the target file, while others involve monitoring the run-time behavior. The security module 115 determines 550 whether the target file is malware based on the classification represented by the leaf node, the associated confidence score, and optionally the local security policy. For example, if the client system 110 has low security policies in place (e.g., computers in an Internet café) then the security module 115 can rely entirely on the represented classification to make the determination 550 and disregard the confidence score. On the other hand, if the client system 110 enforces stringent local security policies, then the security module 115 may only consider the represented classification in making the determination 550 if the confidence score exceeds a predetermined numeric threshold value.

Overview of Methodology for the Security System

Figure 6:
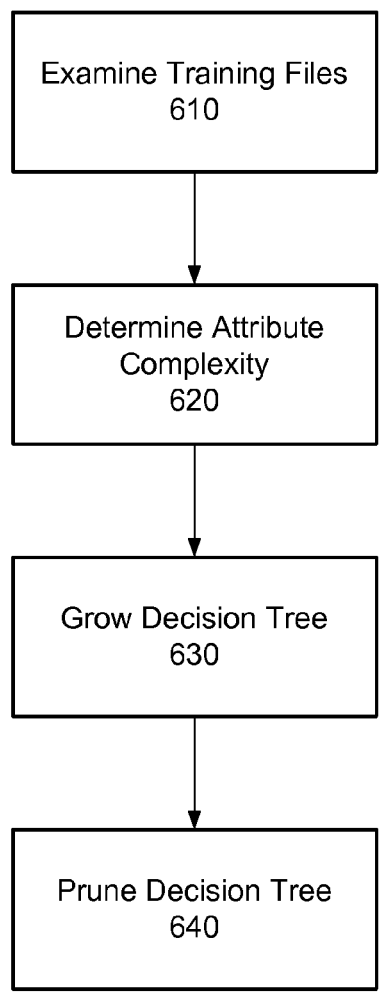
FIGS. 6 and 7 are flow diagrams collectively illustrating a process for constructing a decision tree that takes into account attribute computational complexity according to one embodiment of the present disclosure.

FIG. 6 is a flow diagram illustrating a process 600 for the security system 120 to construct a decision tree that takes into account attribute computational complexity, according to one embodiment. Other embodiments can include different and/or additional steps than the ones described herein.

The security system 120 examines 610 a set of training files with known classification (e.g., legitimate or malware), creates an attribute vector for each of the training files, and associates a label with the attribute vector indicating the classification of the associated training file. The attribute vector includes values of a predetermined set of candidate attributes of the associated training file. The security system 120 determines 620 complexity scores for candidate attributes and grows 630 a decision tree using the attribute vectors. The growing step 630 is illustrated in FIG. 7 and described in detail below.

Figure 7:
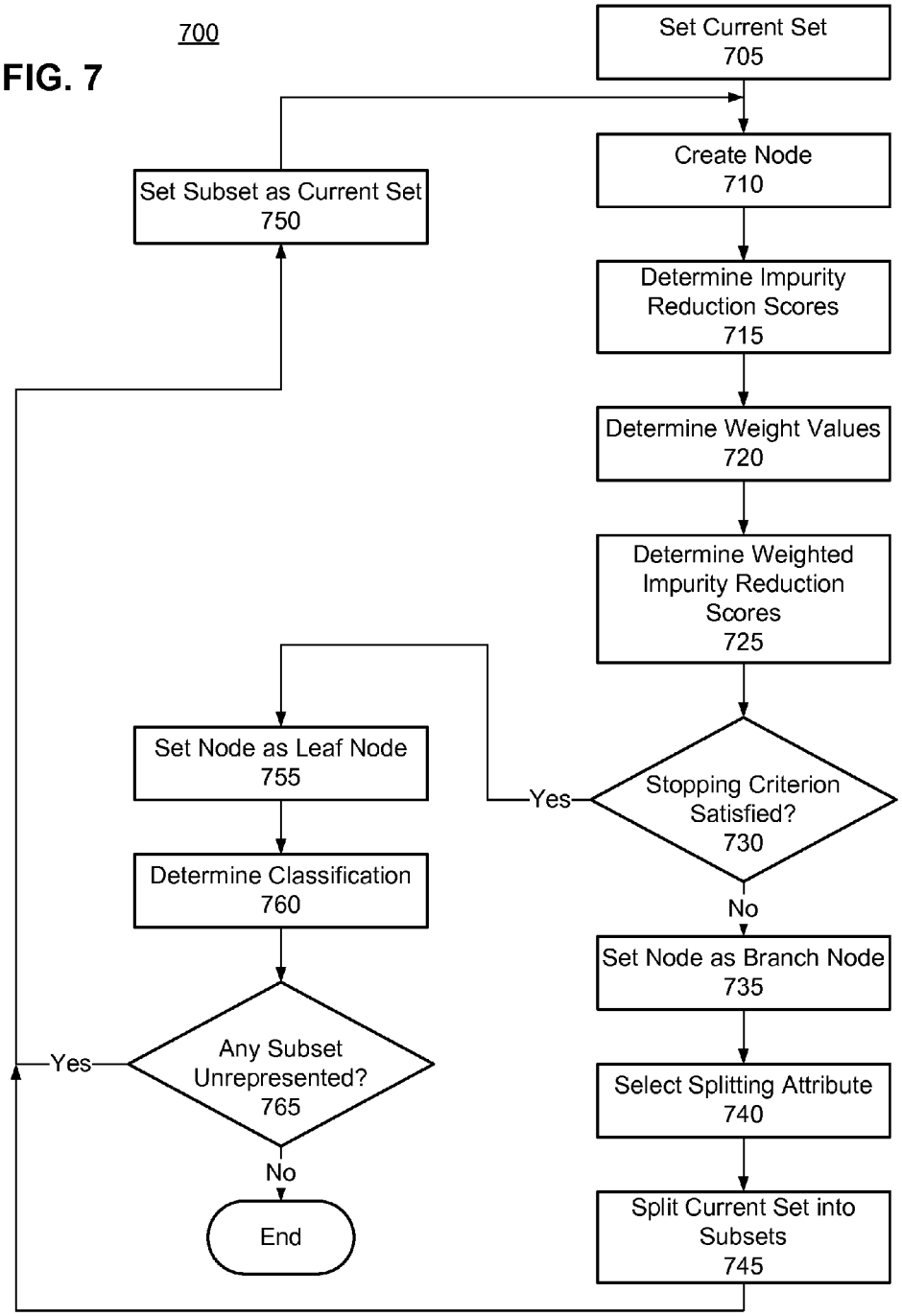

Referring now to FIG. 7, a flow diagram illustrating a process 700 for the security system 120 to grow 630 a decision tree by recursively applying a decision tree induction procedure for a current set of attribute vectors, according to one embodiment. As shown, the security system 120 initially sets 705 the attribute vectors created for the set of training files as the current set, and creates 710 a node for the current set of attribute vectors (hereinafter called the current node). The security system 120 determines 715 an impurity reduction score for each candidate attribute to measure how well the attribute separates the current set of attribute vectors according to their labels. The security system 120 also determines 720 a weight value for each candidate attribute by applying a weight function to the complexity score of the candidate attribute and the current set of attribute vectors and a depth of the current node in the decision tree. The security system 120 determines 725 a weighted impurity reduction score for each candidate attribute based on the impurity reduction score and the weight value of the attribute.

The security system 120 determines 730 whether a stopping criterion is satisfied by examining the current set and the weighted impurity reduction scores. If no stopping criterion is satisfied, the security system 120 sets 735 the current node as a branch node, and selects 740 a candidate attribute with the highest weighted impurity reduction score as the splitting attribute of the branch node. The security system 120 splits 745 the current set of attribute vectors into subsets based on their attribute values of the splitting attribute. The security system 120 sets 750 one of the subsets of attribute vectors as the current set, and repeats the process by creating 710 a current node for the current set. In one embodiment, the security system 120 removes the selected attribute from the set of candidate attributes for the subsets.

If a stopping criteria is satisfied, the security system 120 sets 755 the current node as a leaf node, and determines 760 the represented classification and confidence score of the leaf node by examining the current set of attribute vectors. The security system 120 then determines 765 whether there is any subset of attribute vectors not yet represented by a node in the decision tree. If such a subset exists, the security system 120 sets 750 it as the current set and repeats the process by creating 710 a current node for the current set. Otherwise, the security system 120 determines that the decision tree is completely grown and the process 700 ends.

Referring back to FIG. 6, the security system 120 prunes 640 the decision tree by applying the decision tree to a set of examining files with known classification, and replacing a branch node with a leaf node when the entropy of the attribute vectors applicable at the node exceeds the entropy of the examining files applicable at the node. The decision tree can then be sent to security modules 115 running on the client system 110 to be used to detect malware.

The above approach beneficially requires that a more expensive attribute be used in a branch node of a decision tree only if its benefits sufficiently outweigh the benefits of using a less expensive and perhaps less beneficial attribute. As a result, expensive attributes are pushed down the decision tree and thereby improves the performance of the decision tree.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for constructing a decision tree that takes into account attribute computational complexity. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for constructing a decision tree for classifying computer files based on the computational complexities of attributes of the files, comprising:

creating a plurality of attribute vectors for a plurality of training files, each training file classified as legitimate or malware, and each attribute vector comprising values of a predetermined set of attributes for an associated training file;

determining a computational complexity score for each attribute in the predetermined set of attributes, the computational complexity score measuring a cost associated with determining a value of an associated attribute for a training file;

recursively growing the decision tree based on the plurality of attribute vectors and the computational complexity scores; and providing the recursively grown decision tree to a client system, the client system adapted to traverse the decision tree to classify a target file at the client system as legitimate or malware.

2. The computer-implemented method of claim 1, wherein recursively growing the decision tree comprises:

recursively applying a decision tree induction procedure based on the computational complexity scores of the attributes and how well the attributes separate the plurality of attribute vectors according to the associated training files' classifications.

3. The computer-implemented method of claim 1, wherein recursively growing the decision tree comprises:

determining a weighted impurity reduction score for at least one attribute of the predetermined set of attributes based on the computational complexity score of the at least one attribute, the weighted impurity reduction score quantifying a cost-benefit tradeoff for the at least one attribute in separating the plurality of attribute vectors according to the associated training files' classifications.

4. The computer-implemented method of claim 3, wherein determining the weighted impurity reduction score comprises:

determining an impurity reduction score for the at least one attribute, wherein the impurity reduction score for the at least one attribute measures how well the at least one attribute separates the plurality of attribute vectors according to the associated training files' classifications and the weighted impurity reduction score for the at least one attribute is determined based on the impurity reduction score and the complexity score of the at least one attribute.

5. The computer-implemented method of claim 1, further comprising:

pruning the decision tree based on a plurality of examining files.

6. The computer-implemented method of claim 1, wherein recursively growing the decision tree comprises:

(1) setting the plurality of attribute vectors as a current set;

(2) determining a weighted impurity reduction score for at least one attribute of the predetermined set of attributes based on the complexity score of the attribute, the weighted impurity reduction score quantifying a cost-benefit tradeoff for an associated attribute in classifying the current set;

(3) selecting a splitting attribute from the at least one attribute of the predetermined set of attributes;

(4) splitting the current set into subsets using the splitting attribute; and (5) repeating steps (2) through (4) for each of the subsets as the current set.

7. The computer-implemented method of claim 1, further comprising:

receiving a request from a security module of the client system for the decision tree; and providing the decision tree to the security module responsive to the request.

8. A computer system for constructing a decision tree for classifying computer files that takes into account computational complexities of attributes of the files, comprising:

a computer-readable storage medium storing executable computer program code; and a processor for executing the executable computer program code, wherein the computer program code is executable to perform steps comprising:

creating a plurality of attribute vectors for a plurality of training files, each training file classified as legitimate or malware, and each attribute vector comprising values of a predetermined set of attributes for an associated training file;

determining a computational complexity score for each attribute in the predetermined set of attributes, the computational complexity score measuring a cost associated with determining a value of an associated attribute for a training file;

recursively growing the decision tree based on the plurality of attribute vectors and the computational complexity scores; and providing the recursively grown decision tree to a client system, the client system adapted to traverse the decision tree to classify a target file at the client system as legitimate or malware.

9. The computer system of claim 8, wherein recursively growing the decision tree comprises:

recursively applying a decision tree induction procedure based on the computational complexity scores of the attributes and how well the attributes separate the plurality of attribute vectors according to the associated training files' classifications.

10. The computer system of claim 8, wherein recursively growing the decision tree comprises:

determining a weighted impurity reduction score for at least one attribute of the predetermined set of attributes based on the computational complexity score of the at least one attribute, the weighted impurity reduction score quantifying a cost-benefit tradeoff for the at least one attribute in separating the plurality of attribute vectors according to the associated training files' classifications.

11. The computer system of claim 10, wherein determining the weighted impurity reduction score comprises:

determining an impurity reduction score for the at least one attribute, wherein the impurity reduction score for the at least one attribute measures how well the at least one attribute separates the plurality of attribute vectors according to the associated training files' classifications and the weighted impurity reduction score for the at least one attribute is determined based on the impurity reduction score and the complexity score of the at least one attribute.

12. The computer system of claim 8, wherein the code is further executable to perform steps comprising:

pruning the decision tree based on a plurality of examining files.

13. The computer system of claim 8, wherein recursively growing the decision tree comprises:

(1) setting the plurality of attribute vectors as a current set;

(2) determining a weighted impurity reduction score for at least one attribute of the predetermined set of attributes based on the complexity score of the attribute, the weighted impurity reduction score quantifying a cost-benefit tradeoff for an associated attribute in classifying the current set;

(3) selecting a splitting attribute from the at least one attribute of the predetermined set of attributes;

(4) splitting the current set into subsets using the splitting attribute; and (5) repeating steps (2) through (4) for each of the subsets as the current set.

14. The computer system of claim 8, wherein the code is further executable to perform steps comprising:

receiving a request from a security module of the client system for the decision tree; and providing the decision tree to the security module responsive to the request.

15. A computer-implemented method of detecting malware at a client, comprising:

receiving, at the client, a decision tree from a remote security system via a network, the decision tree constructed using steps comprising:

creating a plurality of attribute vectors for a plurality of training files, each training file classified as legitimate or malware, and each attribute vector comprising values of a predetermined set of attributes for an associated training file;

determining a computational complexity score for each attribute in the predetermined set of attributes, the computational complexity score measuring a cost associated with determining a value of an associated attribute for a training file; and recursively growing a decision tree based on the plurality of attribute vectors and the computational complexity scores, traversal of the grown decision tree indicating whether a target file is legitimate or malware;

identifying a target file at the client; and classifying, using the decision tree, the identified target file as legitimate or malware.

16. The computer-implemented method of claim 15, wherein classifying the target file as legitimate or malware comprises:

traversing nodes of the decision tree based on attribute values of the target file to reach a leaf node having an associated classification; and classifying the target file as legitimate or malware responsive to the classification associated with the leaf node.

17. The computer-implemented method of claim 15, wherein recursively growing the decision tree comprises:

recursively applying a decision tree induction procedure based on the computational complexity scores of the attributes and how well the attributes separate the plurality of attribute vectors according to the associated training files' classifications.

18. The computer-implemented method of claim 15, wherein recursively growing the decision tree comprises:

determining a weighted impurity reduction score for at least one attribute of the predetermined set of attributes based on the computational complexity score of the at least one attribute, the weighted impurity reduction score quantifying a cost-benefit tradeoff for the at least one attribute in separating the plurality of attribute vectors according to the associated training files' classifications.

19. The computer-implemented method of claim 15, further comprising:

pruning the decision tree based on a plurality of examining files.

20. The computer-implemented method of claim 15, wherein recursively growing the decision tree comprises:

(1) setting the plurality of attribute vectors as a current set;

(2) determining a weighted impurity reduction score for at least one attribute of the predetermined set of attributes based on the complexity score of the attribute, the weighted impurity reduction score quantifying a cost-benefit tradeoff for an associated attribute in classifying the current set;

(3) selecting a splitting attribute from the at least one attribute of the predetermined set of attributes;

(4) splitting the current set into subsets using the splitting attribute; and (5) repeating steps (2) through (4) for each of the subsets as the current set.

* * * * *